(12) United States Patent
Pincus et al.

(10) Patent No.: US 9,058,065 B2
(45) Date of Patent: Jun. 16, 2015

(54) HAND-HELD ORTHOPEDIC ELECTRONIC INTERFACE DEVICE AND METHOD OF MANUFACTURE

(75) Inventors: Allan Pincus, Green Brook, NJ (US); Walter D. Barger, III, Cherry Hill, NJ (US)

(73) Assignee: Custom Device Technologies, LLC, Warren, NJ (US)

( * ) Notice: Subject to any disclaimer, the term of this patent is extended or adjusted under 35 U.S.C. 154(b) by 698 days.

(21) Appl. No.: 13/267,942

(22) Filed: Oct. 7, 2011

(65) Prior Publication Data

US 2012/0098742 A1    Apr. 26, 2012

Related U.S. Application Data

(60) Provisional application No. 61/405,759, filed on Oct. 22, 2010.

(51) Int. Cl.
*B29C 33/38* (2006.01)
*G06F 3/033* (2013.01)
*G06F 3/0354* (2013.01)

(52) U.S. Cl.
CPC ......... *G06F 3/033* (2013.01); *B29C 2033/3871* (2013.01); *B29C 33/3878* (2013.01); *B29C 33/3857* (2013.01); *G06F 3/03543* (2013.01); *G06F 2203/0333* (2013.01)

(58) Field of Classification Search
CPC ............ B29C 33/3857; B29C 33/3878; B29C 2033/3871
USPC .......... 264/220, 221, 222, 223, 225, 226, 227
See application file for complete search history.

(56) References Cited

U.S. PATENT DOCUMENTS

| 630,941 | A | | 8/1899 | Sieben | |
|---|---|---|---|---|---|
| 2,836,530 | A | * | 5/1958 | Rees | ................. 264/226 X |
| 5,576,733 | A | | 11/1996 | Lo | |

(Continued)

FOREIGN PATENT DOCUMENTS

| JP | 2008-204263 A | 9/2008 |
|---|---|---|
| KR | 10-2004-007110 A | 8/2004 |

OTHER PUBLICATIONS

PCT Search Report & Written Opinion; PCT/US2012/057428; Pincus, Allan; Jun. 29, 2012.

(Continued)

*Primary Examiner* — Leo B Tentoni
(74) *Attorney, Agent, or Firm* — Gearbart Law, LLC

(57) ABSTRACT

An orthopedic cursor control device that supports a user's hand, or other controlling anatomy, in a functionally neutral posture. The device has a motion sensor housed in a base, a mound attached to the top of the base and an optional carpal support attached to the base. The surfaces of the base, mound and optional carpal support together support a user's hand, or other controlling anatomy, in the functionally neutral, or other appropriate, posture. The mound conforms to an interior portion of the user's hand when in a grasping configuration. An inner surface of the carpal support conforms to, and supports, the user's wrist in the functionally neutral posture. The carpal support extends beyond a distal end of the user's ulna bone when the user grasps the cursor control device. The functionally neutral posture has, at the distal end, the user's radial bone substantially vertically above their ulna bone.

7 Claims, 12 Drawing Sheets

(56) References Cited

U.S. PATENT DOCUMENTS

| | | | |
|---|---|---|---|
| 6,064,371 A | 5/2000 | Bunke et al. | |
| 6,177,034 B1 * | 1/2001 | Ferrone | 264/222 X |
| 6,229,527 B1 | 5/2001 | Shearn | |
| 6,284,168 B1 * | 9/2001 | Robinson | 264/220 X |
| 6,362,811 B1 | 3/2002 | Edwards | |
| 6,532,002 B2 | 3/2003 | Segalle | |
| 6,545,665 B2 | 4/2003 | Rodgers | |
| 6,664,947 B1 | 12/2003 | Vinogradov | |
| 2001/0024192 A1 | 9/2001 | Lewis | |
| 2001/0052894 A1 | 12/2001 | Segalle | |
| 2002/0057258 A1 | 5/2002 | Reid | |
| 2002/0105500 A1 | 8/2002 | Edwards | |
| 2002/0118174 A1 | 8/2002 | Rodgers | |
| 2003/0098851 A1 | 5/2003 | Brink | |
| 2008/0186279 A1 | 8/2008 | Van Dalen | |

OTHER PUBLICATIONS

PCT International Preliminary Report on Patentability; PCT/US2012/057428; Pincus, Allan; Apr. 23, 2013.

* cited by examiner

HAND-HELD ORTHOPEDIC ELECTRONIC INTERFACE DEVICE AND METHOD OF MANUFACTURE

CLAIM OF PRIORITY

This application claims priority to U.S. Ser. No. 61/405,759 filed on Oct. 22, 2010, the contents of which are fully incorporated herein by reference.

FIELD OF THE INVENTION

The invention relates to electronic interface devices and methods of their manufacture, and more particularly, to customized, orthopedic cursor control devices and methods of easily fabricating them to closely conform to the relevant dimensions of an individual.

BACKGROUND OF THE INVENTION

The invention relates to for orthopedic electronic interface devices, such as an orthopedic computer mouse, is driven by the variety, and severity, of injuries such as, but not limited to, repetitive stress injuries, that are associated with the prolonged use of conventional computer mice and other conventional electronic interface devices. As many medical and scientific studies have confirmed, the repeated fine motor movements of the hand, wrist and forearm made in operating such conventional devices may result in painful, chronic conditions such as carpal tunnel syndrome, tendonitis, loss of grip strength, Raynaud's phenomenon, Dequervain's disease and trigger finger. These repetitive stress injuries are particularly prevalent when the cursor control device requires prolonged use with the hands or wrist in awkward or unnatural positions, or positions that require continuous activation of muscles, or with arthritis or in amputees. These repetitive stress injuries, and other related problems, may be avoided by having am electronic interface device designed to minimize stress on a user's hand and wrist. This may, for instance, be done by maintaining the user's hand in a functionally neutral posture during use of the device. An orthopedic cursor control device may also be designed to provide stability and to minimize the need for muscle activation when used to control the position of a cursor on a display screen. And in a further embodiment, the orthopedic cursor control device may also maintain a user's hand and wrist at a temperature within a therapeutically desirable range.

DESCRIPTION OF THE RELATED ART

The relevant prior art involving orthopedic cursor control devices includes:

US Patent Application 20030098851 by S. Brink published on May 29, 2003 entitled "Pointing means for a computer" that describes a pointing means for a computer and to a method of achieving a position of rest for a person who operates a pointing means, said pointing means being ergonomically shaped to fill a human hand. The object of the invention is to avoid injuries by the use of the pointing means for a computer by ensuring that the joints, muscles and tendons of the hand and the arm are not strained unnecessarily in use. The pointing means may be constructed so that the thumb engages a recess (6) which is a lengthwise recess (6) with a thumb supporting face (20) having thumb support on a first side (22) and a second opposite side (24) where the recess (6) can have an extension supporting the thumb as well as engagement means (10) for the ball of the thumb. It is ensured hereby that the hand is in a position of rest while the pointing means is operated. The pointing means fills the hand, and the actual movement of the pointing means is performed by the forearm and the wrist. The muscles and tendons of the hand remain in the position of rest during operation of the pointing means. Mouse injuries can be prevented hereby.

US Patent Publication 20010052894 by Segalle published on Dec. 20, 2001 entitled "Orthopedic computer mouse" that describes an orthopedic computer mouse which can be translated over a support surface, the mouse adapted for supporting the hand in the "physiological position" or "position of function". The proposed shape was obtained from a mold of the human hand, and the mold was realized in the "position of function." This position forces the user's hand to be placed in a position of function, thus eliminating the possibility of diseases. The present invention provides an orthopedic computer mouse which is "innocuous," i.e., a computer mouse which has no adverse effect on, or which is harmless to the user. The mouse comprises a bottom surface, a forward end, a rear end, and opposite sides, and a generally hemispherical surface for supporting the fingers of a hand in a generally elevated orientation relative to the support surface with the little finger at a first elevation and the index finger located at a second elevation higher than the first elevation relative to the bottom surface. The generally hemispherical surface is further adapted for supporting the hollow of the hand so that the hand rests at an angle with respect to the forearm in the physiological position. The general hemispherical finger-supporting surface extends upwardly and laterally from one of the opposite sides. A thumb-supporting surface is provided for supporting the thumb of the hand, so that the mouse is securely gripped between the thumb and the fingers, the thumb supporting surface being disposed opposite the generally hemispherical finger-supporting surface.

U.S. Pat. No. 6,545,665 by Rodgers published on Apr. 8, 2003 entitled "Adjustable computer pointing device" that describes a computer pointing device consists of a adjustable hand support shape and adjustable controls that work together to conform to an individuals natural grip. This allows multiple individual users to shape the device body for their maximum comfort using a squeezing action. A targeted ergonomic configuration allows a user to configure the angle of the hand in the most natural way to minimize twist and strain on the wrist. The adjustable structure and button assembly are attached to a flat bottomed base that rests on an underlying flat surface. Attached to the base are the electronic and the mechanical component necessary to provide the required positional and event outputs to a computer.

U.S. Pat. No. 5,576,733 to Lo published on Nov. 19, 1996 entitled "Ergonomic computer mouse" that describes an ergonomic computer mouse includes an upright, primary finger-supporting surface for supporting all of the fingers of an upright hand in straight positions and in an upright stack. It also includes an opposite thumb-supporting surface for supporting the thumb. A hand holding the ergonomic computer mouse will be in a naturally upright and relaxed position, without requiring twisting of the hand, wrist, or forearm. As a result, fatigue, discomfort, and pain are minimized or eliminated even after a long period of continuous use.

Various implements are known in the art, but fail to address all of the problems solved by the invention described herein. One embodiment of this invention is illustrated in the accompanying drawings and will be described in more detail herein below.

SUMMARY OF THE INVENTION

The present invention is an orthopedic electronic interface device used, for instance, to control a position and function of a cursor on a display screen. The device is preferably a computer mouse, but may also be a game controller or a remote control. In other, preferred embodiments, the present invention may also be a foot-controlled user interface.

In one preferred embodiment, the device may be hand operated and perform a control function while supporting a user's hand in a functionally neutral posture.

The electronic interface device may, for instance, have a motion sensor housed in a base, a mound rigidly attached to the top of the base and a carpal support rigidly attached to the base. Portions of the surfaces of the base, the mound and the carpal support may function together to support a user's hand in a functionally neutral posture.

In a preferred embodiment, the mound of the hand-held electronic interface device may be shaped to closely conform to an interior portion of the user's hand when the user's hand is in a grasping configuration. In addition, an inner surface of the carpal support may be shaped to closely conform to, and support, the user's wrist in the functionally neutral posture.

The length of the carpal support may be such that it extends out beyond a distal end of the user's ulna bone when the user grasps the mound of the cursor control device with their hand.

In a preferred embodiment, the functionally neutral posture of the wrist may be that position in which the distal end of the user's radial bone is substantially vertically above the distal end of the user's ulna bone.

A further embodiment of the invention may include a wrist support rigidly attached to the base. The wrist support may extend out from the base to beyond the distal end of the user's ulna bone, and may have an upper surface shaped to support a part of a user's forearm.

In a preferred embodiment, the outer surfaces of the mound of the hand-held cursor control device, the inner surface of the carpal support of the cursor control device and the upper surface of the wrist support of the cursor control device may form a contiguous surface. The contiguous surface, or device shell, may be shaped to closely conform to a particular user's hand. This is in marked contrast to existing, prior art devices that typically are designed to fit one prototypical sized user hand. Shaping the device to closely conform to a particular user's hand may, for instance, be achieved by a method such as, but not limited to, a molding process that uses a block of malleable material that has been grasped by the user's hand while the user's hand is in a functionally neutral posture. The mold, or the user's hand may be turned into suitable numerical data by, for instance, using a 3D optical scanner. The suitable numerical data may be feed raw or post-processed to a manufacturing device such as, but not limited to, to a computer controlled milling machine or lathe or 3D printing machine, or some combination thereof.

Such a method may, for instance, include providing a block of malleable material in the approximate shape of the cursor control device to be produced. The person that the custom cursor control device is being prepared for, may, with their hand and wrist in the desired functionally neutral posture, grasp the block of malleable material. The user may then squeeze the malleable material so that the outer surface of the block assumes the shape of the inner surface of the user's grasping hand. The grasped block may then be prepared to function as a molding pattern, and the shell of the cursor control device molded from it, or a suitable 3D scan made of it for use in computer controlled manufacturing devices.

Therefore, the present invention succeeds in conferring the following, and others not mentioned, desirable and useful benefits and objectives.

It is an object of the present invention to provide a cursor control device that minimizes, or completely removes, the possibility of suffering a repetitive stress injury when using the device.

It is another object of the present invention to provide a cursor control device that supports a user's wrist in functionally neutral posture.

Yet another object of the present invention is to provide a cursor control device that is closely customized to an individual user.

Yet another object of the present invention is to provide a cursor control device that may be heated or cooled to a therapeutically desired temperature.

Still another object of the present invention is to provide a simple method of producing an orthopedic cursor control device.

Still another object of the present invention is to provide an efficient, and cost effective, method of producing an orthopedic cursor control device that is customized for individual users.

DESCRIPTION OF THE PREFERRED EMBODIMENTS

Figure 1:
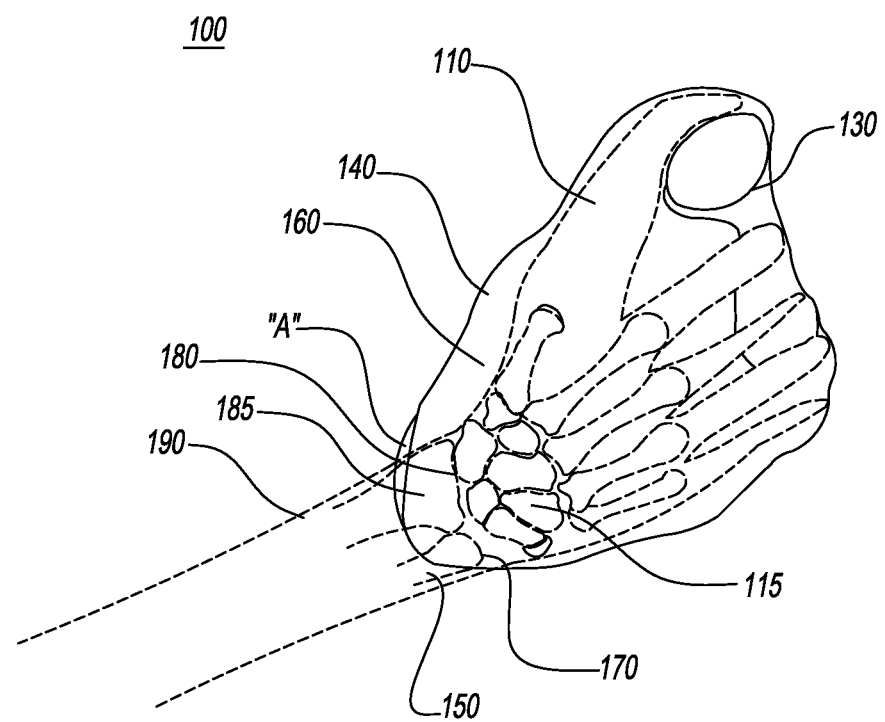
FIG. 1 shows a perspective view demonstrating the use of a preferred embodiment of the present invention, designed for use by a right handed person.

The preferred embodiments of the present invention will now be described with reference to the drawings. Identical elements in the various figures are identified with the same reference numerals.

Reference will now be made in detail to embodiments of the present invention. Such embodiments are provided by way of explanation of the present invention, which is not intended to be limited thereto. In fact, those of ordinary skill in the art may appreciate upon reading the present specification and viewing the present drawings that various modifications and variations can be made thereto.

FIG. 1 shows a perspective view demonstrating the use of the preferred embodiment of the electronic interface device 100 of the present invention. The electronic interface device 100 shown in FIG. 1 is designed for use by a right-handed person. One of ordinary skill in the art will readily appreciate that a mirrored version of the device shown in FIG. 1 could be used by a left-handed person. Throughout this application, electronic interface device 100 will be shown as a right-handed device. One of ordinary skill in the art will readily appreciate that by mirroring any of the drawings about a vertical plane running from the front to the back of the device, or by applying such mirroring to any discussions of relative position of elements comprising the device, a left-handed device may be described that is functionally equivalent to the right-handed device.

In FIG. 1, the orthopedic electronic interface device 100 is shown schematically to be supporting a user's hand 110 in a functionally neutral posture 115. The cursor control device 100 may be comprised of a base 120, a mound 130 and a carpal support 140.

The functionally neutral posture 115 of the user's hand 110 and wrist 190 is preferably a posture that may be maintained with little, or no, muscle activity. This may, for instance, be the position defined by a distal end 180 of the user's radial bone 185 being located substantially vertically above a distal end 170 of the user's ulna bone 150.

The mound 130 of the cursor control device 100 may, for instance, be shaped to closely conform to a relevant portion of the inner surface of the user's hand 110 when the user's hand 110 is grasping and positioned in the functionally neutral posture 115. This close conformity to the inner surface of the user's hand 110 may be achieved by a method such as, but not limited to, molding a shell, or a portion of the shell of the cursor control device 100 from detailed measurements of the inner surface of the user's hand when the user's hand 110 is grasping and positioned in a functionally neutral posture 115. The detailed measurements may be made by a method such as, but not limited to, making an impressing in molding clay, or by 3-D surface measurement device such as a 3-D laser profile sensor.

The carpal support 140 of the cursor control device 100 may, for instance, extend beyond a distal end 170 of the user's ulna bone 150.

Figure 2:
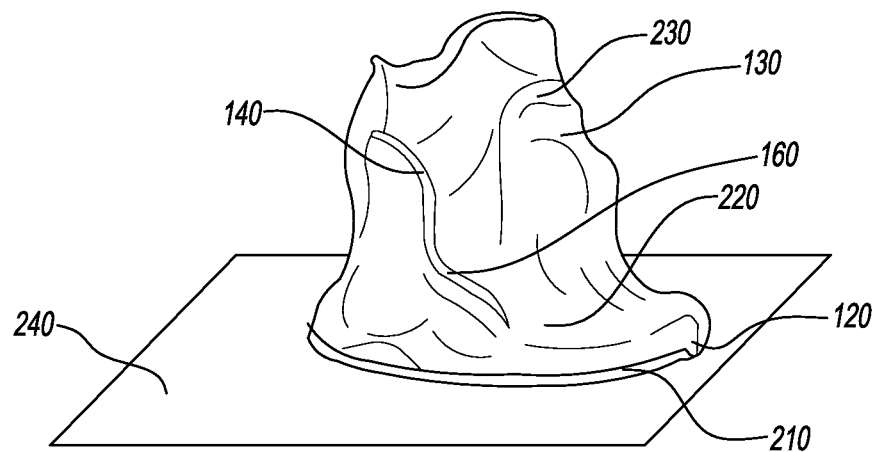
FIG. 2 shows a rear view of the preferred embodiment.

FIG. 2 shows a rear view of a preferred embodiment of the cursor control device 100. In this view the carpal support 140 may be seen as a curved, vertical ridge having an inner surface 160 that may closely conform to, and support, an inner and lower portion of the user's wrist 190. This close conformity of the inner surface 160 to inner and lower portions of the user's wrist 190 may be achieved by a method such as, but not limited to, molding a shell, or a portion of the shell of the cursor control device 100 from detailed measurements of the relevant inner and lower portions of the user's wrist when the user's hand 110 is grasping and positioned in the functionally neutral posture 115. The detailed measurements may be made by a method such as, but not limited to, making an impressing in molding clay, or by 3-D surface measurement device.

The view of FIG. 2 also shows the mound 130 of the cursor control device 100 extending up above the user's grasping hand 110.

FIG. 2 also shows the base 120 of the cursor control device 100 and the attached wrist support 210. The wrist support 210 may be shaped to closely conform to, and support, the underside of the user's wrist 190, when the user is grasping the cursor control device 100 and is in the functionally neutral posture 115.

Figure 3:
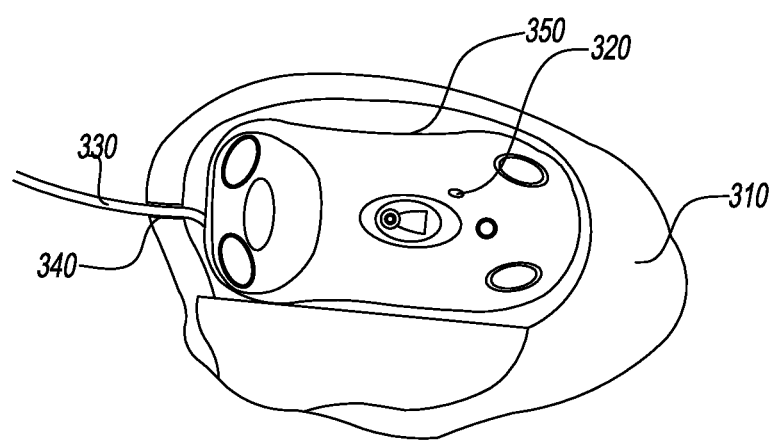
FIG. 3 shows a bottom view of the preferred embodiment.

FIG. 3 shows a bottom view of the preferred embodiment of the cursor control device 100. A motion sensor 320 may be housed in a hollow, concave cavity 350 in the base 120. The bottom surface 310 of the base 120 of the cursor control device 100 may be substantially flat.

The motion sensor 320 may, for instance, be a device capable of sensing relative motion between the bottom surface 310 of the base 120 and any substantially horizontal surface 240 on which the cursor control device 100 may reside. The motion sensor 320 may, for instance, be a device such as, but not limited to, a computer mouse, a track ball, an optical computer mouse, one or more accelerometers or some combination thereof.

Figure 4:
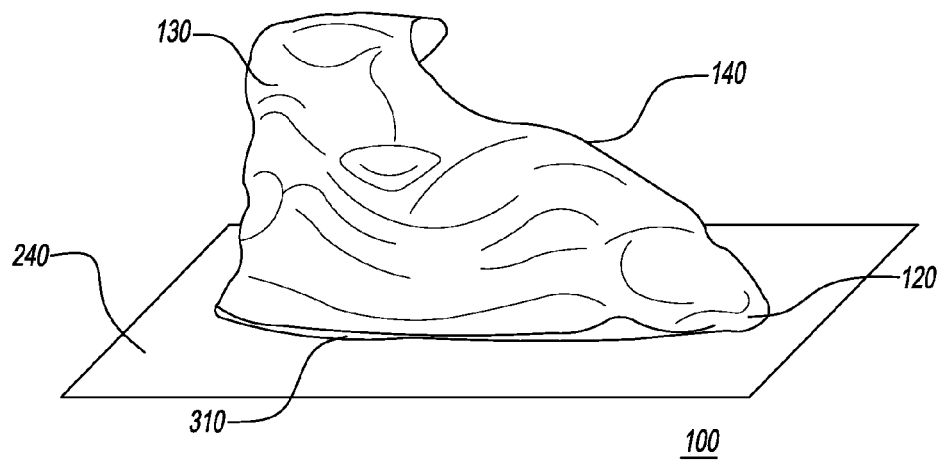
FIG. 4 shows a side view of the preferred embodiment taken from the side having the carpal support.

FIG. 4 shows a side view of the preferred embodiment taken from the side with the carpal support 140. The carpal support 140 may be a continuous, vertical ridge, extending up from the base 120 of the cursor control device 100, when the bottom surface 310 of the cursor control device 100 rests on a substantially horizontal surface 240.

Figure 5:
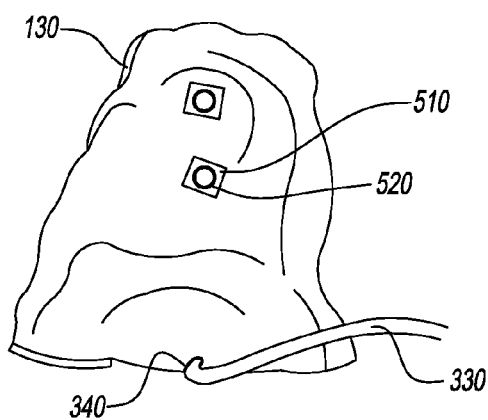
FIG. 5 shows a front view of the preferred embodiment.

FIG. 5 shows a front view of the preferred embodiment of the cursor control device 100. This view shows actuators 510 that may have a surface 520 that protrudes through an opening 530 in the otherwise contiguous surface of the mound 130.

The actuator 510 may, for instance, be an electro-mechanical switch such as, but not limited to, a push button, a proximity switch, a pressure switch, a rotary switch or some combination thereof.

FIG. 5 also shows a data link 330 that may connect to the motion sensor 320 via a data link access channel 340. The data link 330 may be a wire link such as, but not limited to, an Ethernet cable, a USB cable, a fiber optic cable, or it may be a wireless data link such as, but not limited to, a blue tooth link, an Ethernet link or a WiFi link, or some combination thereof.

The data link 330 may serve to transfer data regarding the position, relative position, motion or relative motion, or some combination thereof, of the electronic interface device 100. This data may, for instance, be determined by the motion sensor 320. The data may be transferred to a remote device such as, but not limited to, a computer, a mobile device, a television set, or a data display device. The data link 330 may also serve to transfer information concerning the state of one or more actuators 510. The transferred data may then be used to control a remote function such as, but not limited to, to the position of a cursor or other indicia 540 on a display screen 550. The transferred data may also, or instead, activate some function of the remote device such as, but not limited to, opening a browser window, or activating a software module linked to a current position of a cursor on a display screen.

Figure 6:
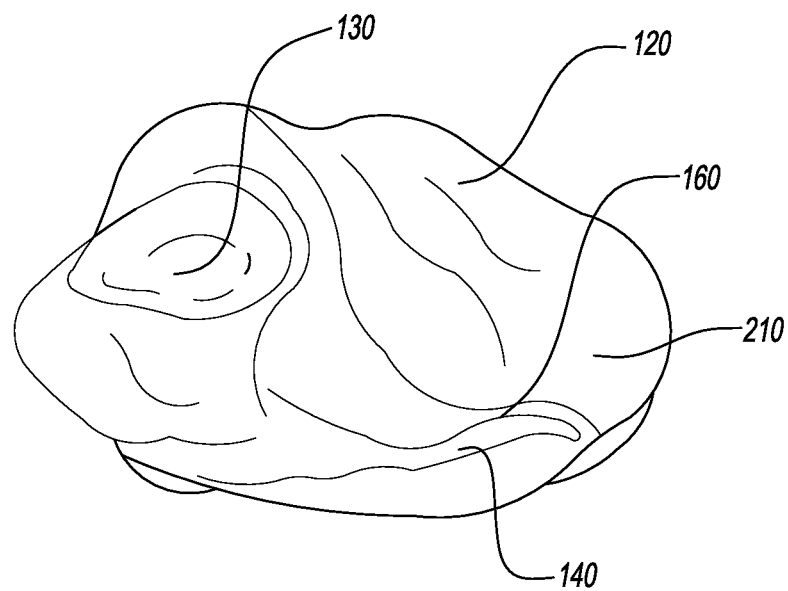
FIG. 6 shows a top view of the preferred embodiment.

FIG. 6 shows a top view of the preferred embodiment.

The shell of the electronic interface device 100 may be made of some suitably easy to mold material such as, but not limited to, thermosetting plastic, a thermoplastic, fiberglass, a polymer, a glass, a ceramic and a plastic. The surface of the shell or the electronic interface device 100 may be draped, or covered, with a material that provides a required grip, comfort or other desirable property.

One suitable material for covering all, or part, of an orthopedic electronic interface device is the polymer AKTON® made by Action Products, Inc., of Hagerstown, Md. Akton is an ultra-soft elastomer, also called a dry visco-elastic polymer. The original formulation of Akton was designed to provide the softness of human fat tissue, but with resilience. The material is commercially available in a range of softness, and a range of thicknesses. Draping Akton that is between 1 and 2 mm thick, with a stress at 200% elongation of between 10-80 psi and more preferably between 15 and 50 psi, over all or part of the surface of the cursor control device 100 may provide a suitable orthopedic device.

In a further embodiment, the electronic interface device 100 may incorporate a heating or cooling capability.

Heating may, for instance, be provided by a conventional resistive element that may be thermostatically controlled to provide a predefined temperature to the surface, or a portion of the surface. The heating may be provided by several means including, but not limited to, a Peltier thermoelectric heat pump, a heatable gel-pad element that may, for instance, be incorporated in the mound 130, the carpal support 140 or the wrist support 210, or some combination thereof.

Cooling may be provided by several means including, but not limited to, a Peltier thermoelectric cooler, a coolable gel-pad element that may, for instance, be incorporated in the mound 130, the carpal support 140 or the wrist support 210, or some combination thereof.

Figure 7:
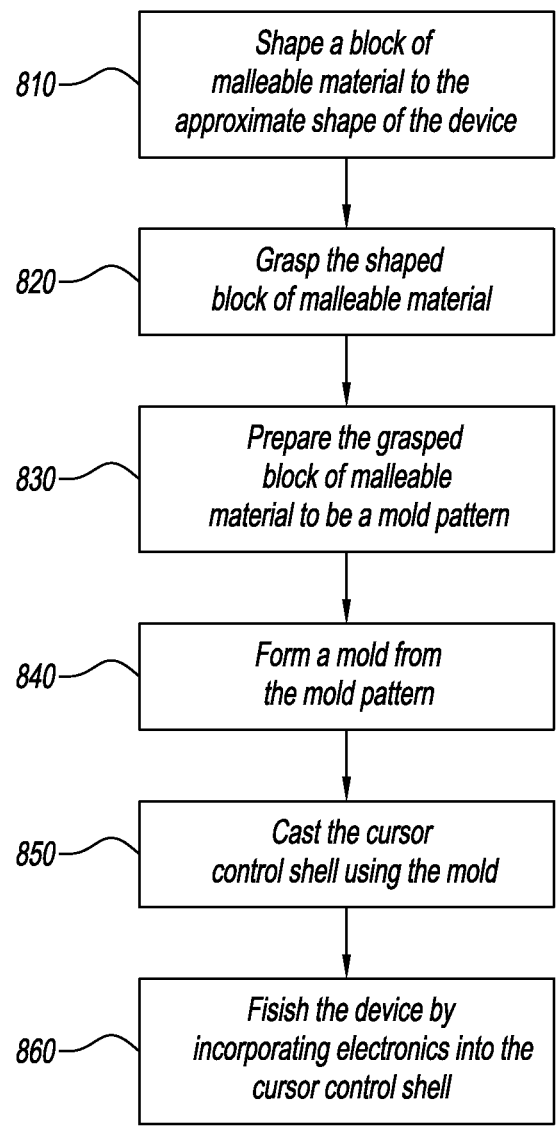
FIG. 7 shows a flow diagram of some of the steps of the method of manufacturing an orthopedic electronic interface device of the present invention.

FIG. 7 shows a flow diagram of some of the steps of the method of manufacturing an orthopedic cursor control device of the present invention.

In Step 810, a device blank, that may be a block of substantially malleable material, may be shaped to the approximate shape of the cursor control device.

The substantially malleable material of the device blank may be a material such as, but not limited to, clay, silicone, wax, low melting point plastic, putty, oil clay, polymer clay, paper clay, plastercine or some combination thereof.

The block 600 may, for instance, be shaped to approximate a base 120 that is sized to house a motion sensor 320 and having a mound 130 that is rigidly attached to the top of the base 120. The mound 130 may be approximately sized to fit an interior portion of a grasping hand 110 positioned in a substantially functionally neutral posture 115. The shaped block 600 or device blank, may also include an approximation of a carpal support 140 that may be rigidly attached to the base 120. The shaped block 600 may be approximately shaped such that the carpal support extends out beyond a distal end 170 of a users ulna bone 150 when the user grasps the shaped block 600.

In Step 820, the device blank, or shaped block 600 of substantially malleable material, may be grasped by the person for whom the custom orthopedic cursor control device 100 is being manufactured.

The user may, for instance, grasp the shaped block 600 approximation to a mound 130 while their hand and wrist are in a functionally neutral posture 115. The user may then gently squeeze the shaped block 600 and allow their hand and forearm to rest on the substantially malleable material at the appropriate location. By squeezing the substantially malleable material and allowing their forearm and wrist to rest on it, the user will impart an imprint of the inside surface of their grasping hand and of the surface shape of their hand, wrist and forearm in the functionally neutral posture 115.

In Step 830 the grasped block of malleable material 700, or device blank, may be prepared to be a mold pattern for use in molding the electronic interface device 100. This preparation will depend to some extent on the molding process and on the material the electronic interface device 100 will be made of.

The molding process may be any standard process such as, but not limited to, compaction molding, compression molding, blow molding, thermoforming, vacuum forming and injection molding.

The material used to make the molded electronic interface device 100 thermosetting plastic, a thermoplastic, fiberglass, a polymer, a glass, a ceramic and a plastic.

Depending on the materials and molding method, the preparation of the grasped block of malleable material to transform it into a suitable mold pattern may include processes such as, but not limited to, removing a portion of the malleable material so as to ensure that a molded device can be easily removed from a mold formed from the molding pattern; adding or removing a layer or a partial layer of a the substantially malleable material so as to compensate for shrinkage or expansion of a the material that will form the molded cursor control device. The shrinkage or expansion may be calculated over a temperature change corresponding substantially to a change from a molding temperature of the molding material to approximately room temperature, which is often assumed to approximately in a range from 10 to 30 degrees centigrade, and often in the range of 20 to 25 degrees centigrade.

In Step 840, a mold may be formed from the mold pattern. This is a well known process and typically involves placing the mold pattern within a frame, and then filling the frame with molten or liquid mold material that will form the mold. When the mold material has cooled, hardened or otherwise set into a mold, the pattern is removed, leaving the mold as a "negative" copy of the mold pattern. Mold materials include, but are not limited to, silicone rubber, urethane rubber, urethane plastic, rigid & flexible foam, epoxy resins and polysulfide rubber.

In Step 850, the electronic interface device 100 may be made, or "molded", using the mold formed using the mold pattern. This process is often called "casting" and typically involves filling the mold with molten or liquid material that will form the shell of the cursor control device 100, i.e., a material such as, but not limited to, thermosetting plastic, a thermoplastic, fiberglass, a polymer, a glass, a ceramic and a plastic, or some combination thereof. The casting may also involve the use of release agents to help ensure that the casting, or object made by the molding material, may be easily removed from the mold.

In Step 860, the electronic interface device 100 may be completed, or finished, by, for instance, adding appropriate electronics such as, but not limited to, the motion sensor 320, the data link 330 and the actuators 510. The step of finishing may also involve machining the hollow, concave cavity 350 to house the motion sensor 320, and the data link access channel 340, if these have not been produced in the molding process.

Figure 8A:
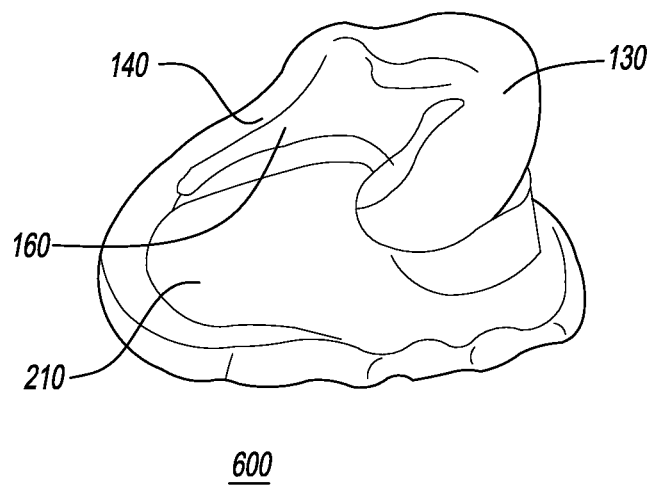
FIG. 8A shows a side, perspective view of a device blank that may be a block of malleable material shaped to approximate a cursor control device of the present invention.

FIG. 8A shows a side, perspective view of a block of malleable material shaped to approximate a cursor control device of the present invention. The mound 130 and the regions that will become the carpal support 140, the inner surface 160 of the carpal support 140 and the wrist support 210 may be clearly identified.

Figures 8B, 8C:
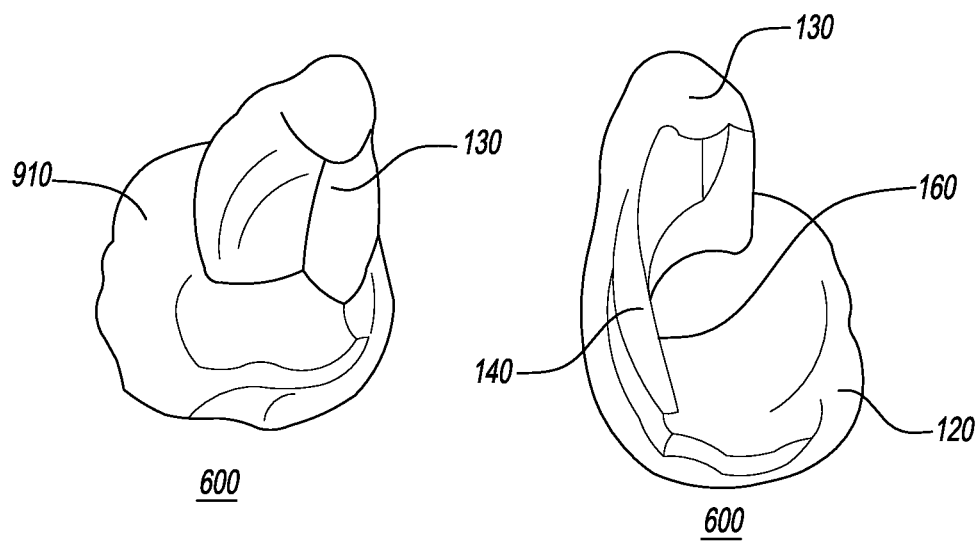
FIG. 8B shows a front, perspective view of the device blank of the present invention.
FIG. 8C shows a side, perspective view of the device blank of the present invention.

FIG. 8B shows a front, perspective view of a block of malleable material shaped to approximate a cursor control device of the present invention. The mound 130 and the region that may become the pinkie support 910 may be clearly identified in this view.

FIG. 8C shows a side, perspective view of a block of malleable material shaped to approximate a cursor control device of the present invention. The mound 130 and the regions that may become the carpal support 140, the inner surface 160 of the carpal support 140 and the base 120 can be clearly identified in this view.

Figure 9:
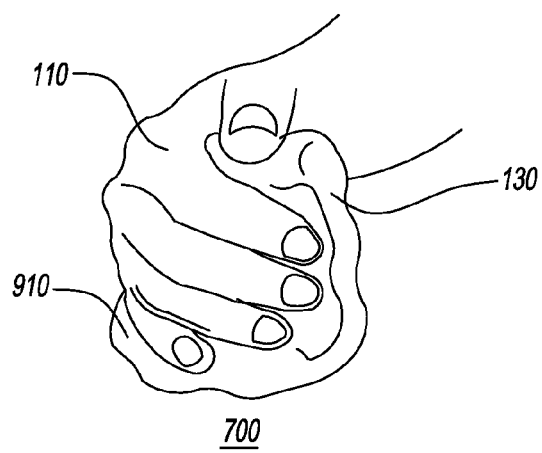
FIG. 9 shows a front view of the device blank being grasped.

FIG. 9 shows a front view of the block of malleable material being grasped. The grasped block of malleable material 700 may be seen to be being squeezed by the user's hand 110 to form a molding pattern 710 that may be a measurement of the inner surface of the grasper's clenched hand. In this view, a little finger of the grasper's hand may be seen forming the pinkie support 910.

Figure 10A:
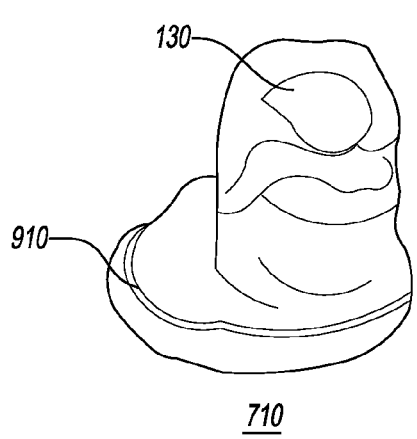
FIG. 10A shows a front perspective view of the device blank after being grasped.

FIG. 10A shows a front perspective view of a block of malleable material after being grasped. The grasped block of malleable material 700 has now become a molding pattern 710 from which a mold may be cast. In this view, the mound 130 and the pinkie support 910 are clearly visible.

Figure 10B:
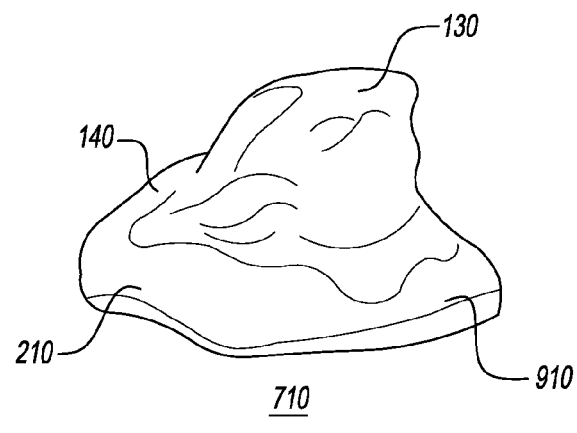
FIG. 10B shows a side perspective view of the device blank after being grasped.

FIG. 10B shows a side perspective view of a block of malleable material after being grasped. The grasped block of malleable material 700 has now become a molding pattern 710 from which a mold may be cast. In this view, the wrist support 210, the carpal support 140, the mound 130 and the wrist 190 may all be clearly identified.

One of ordinary skill in the art will readily appreciate that this method of manufacture may readily be adapted to for some very specific medical uses such as, but not limited to, for producing devices suitable adapted to be suitable for people such as, but not limited to, arthritis sufferers, fibromyalgia sufferers, and people who are missing fingers or have malformed hands.

One of ordinary skill in the art will readily appreciate that although much of the preceding discussion has been directed to computer related cursor control devices, the devices and method of manufacture may readily be applied to a wide variety electronic interface devices used in, for instance, video gaming, controlling program selection on a television including, but not limited to, gaming joysticks and trackballs. As with the individually customized computer mouse described above for illustrative purposes, the methods of manufacture described above may be used to produce a wide range of individually customized devices such as, but not limited to, individually customized joy sticks, track balls or game pads.

For instance, may joy stick controllers have a hand held lever that is used to rotate what is essentially a track ball. The present invention may be adapted to such a device by, for instance, forming the handle to include one or more of a carpal support, a wrist support, a base for the hand and a pinky support. In that way, the even as the hand changes orientation as the joy stick of the joy stick controller is moved, the had will still be supported in a substantially neutral position through all, or most, of the motion necessary to control the electronic interface. This should reduce, or eliminate, repetitive motion fatigue and injury.

Figure 11A:
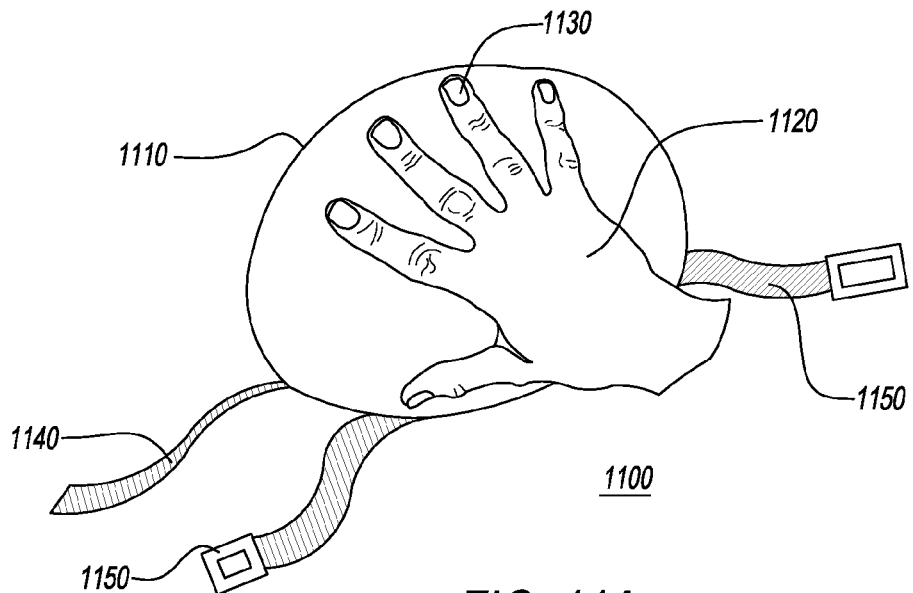
FIG. 11A shows a hand-mould curser controller with an adjustable strap.

FIG. 11A shows a hand-mould curser controller with an adjustable strap.

The hand-mould curser controller 1100 may consist of a curser control base 1110 into which a molded impression of individual user's hand 1120 has been imposed. This may be done by, for instance, an impression of the user's hand being obtained from a mold or by being scanned. This impression may then be digitized, subject to smoothing or correction algorithms, and then used to generate the hand-mould curser controller 1100. The generation may be by any suitable method such as, but not limited to, molding, computer controlled machining tool, 3D printing technology or some combination thereof.

The hand-mould curser controller 1100 may also have a adjustable strap 1150 for helping secure it to a individual user's hand 1160. The hand-mould curser controller 1100 may also have one or more control buttons 1130 that may, for instance, be used to provide additional control functions.

The hand-mould curser controller 1100 may also have a data cable 1140 to convey information to a screen or computer that is being controlled. The data cable 1140 may be a physical cable or it may be a wireless connection or some combination thereof.

Figure 11B:
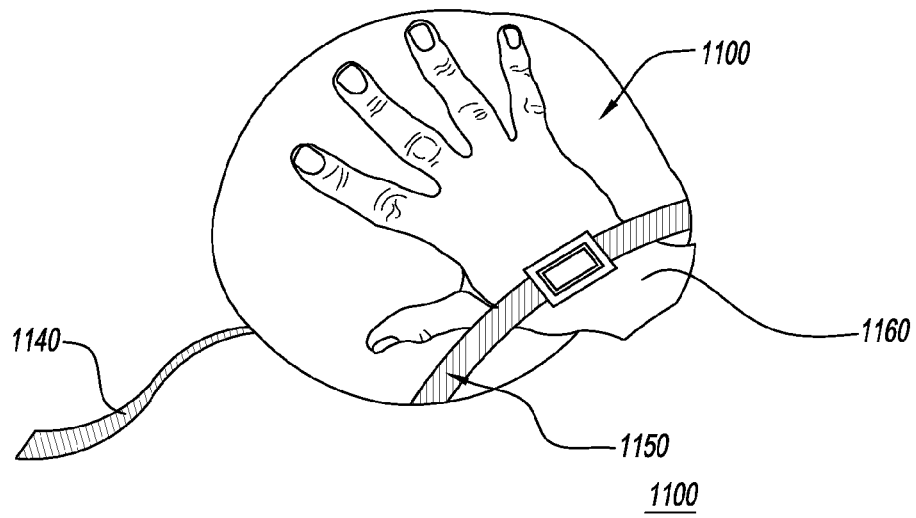
FIG. 11B shows a user using a hand-mould curser controller with an adjustable strap.

FIG. 11B shows a user using a hand-mould curser controller with an adjustable strap. The view of FIG. 11B shows a individual user's hand 1160 attached to the hand-mould curser controller 1100 by an adjustable strap 1150. The hand-mould curser controller 1100 fits the individual user's hand 1160 and relays data to a computer or gaming device via the data cable 1140. Although shown as a cable, one of ordinary skill in the art will readily appreciate that the data cable 1140 may be a wireless connection such as, but not limited to, a BlueTooth connection, a WiFi connection or some other wireless protocol, or some combination thereof.

Figure 12A:
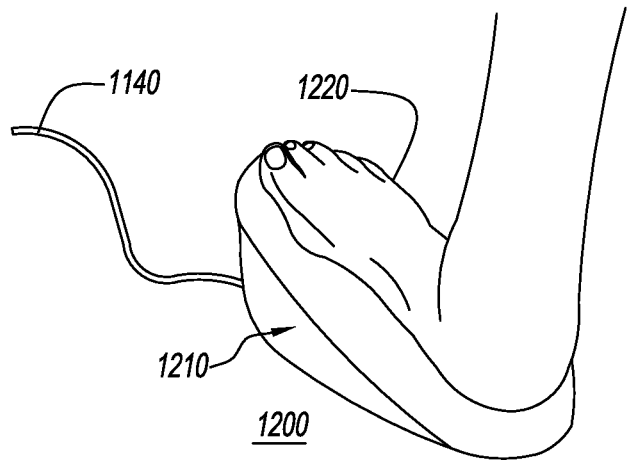
FIG. 12A shows an isometric view of a custom molded foot-operated curser controller being used by a user.

FIG. 12A shows an isometric view of a custom molded foot-operated curser controller being used by a user. In a preferred embodiment, the user may place their individual foot 1220 on the foot cursor control base 1210 of the custom molded foot-operated curser controller 1200 and use it to control the motion of a cursor on a video screen.

Figure 12B:
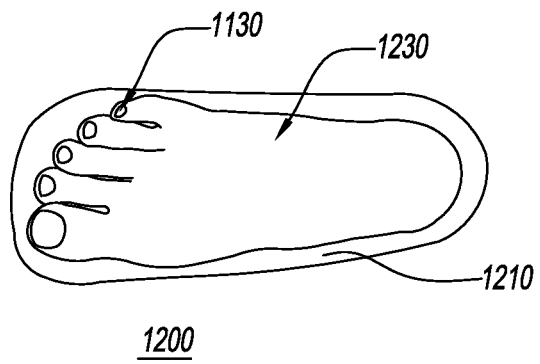
FIG. 12B shows a top view of a custom molded foot-operated curser controller.

FIG. 12B shows a top view of a custom molded foot-operated curser controller. The custom molded foot-operated curser controller 1200 has a molded impression of the individual user's foot 1230. This may be done by a process such as, but not limited to, molding of the foot or 3D laser scanning of the foot or some combination thereof. The molded impression of individual user's foot 1230 in the foot cursor control base 1210 may have one or more control buttons 1130. The control buttons 1130 are preferably place where they may be activated by a user's toes, and may provide additional control functionality.

Figure 12C:
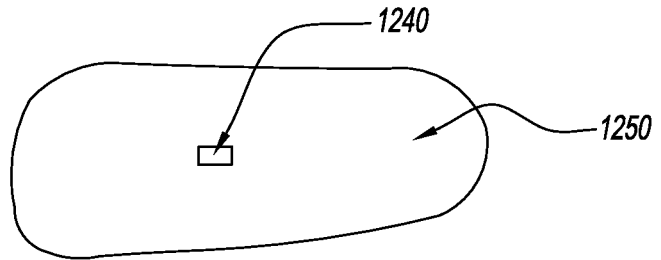
FIG. 12C shows a bottom view of a custom molded foot-operated curser controller.

FIG. 12C shows a bottom view of a custom molded foot-operated curser controller. The underside of foot cursor control base 1250 may contain a motion sensing optics port 1240. The motion sensing optics port 240 may, for instance, have an LED light source that may be used to provide positional information about the custom molded foot-operated curser controller 1200.

Figure 13A:
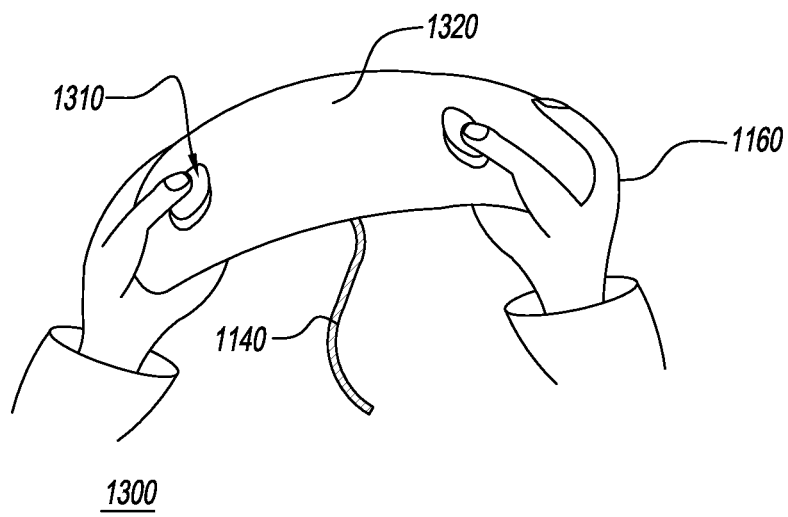
FIG. 13A shows a front view of a custom molded game controller.

FIG. 13A shows a front view of a custom molded game controller. The custom game controller 1300 may be a game controller that is molded to an individual user's grip 1320. The custom game controller 1300 may, for instance, have game control actuators 1310 fitted to be easily activated by the individual user's hand 1160.

Figure 13B:
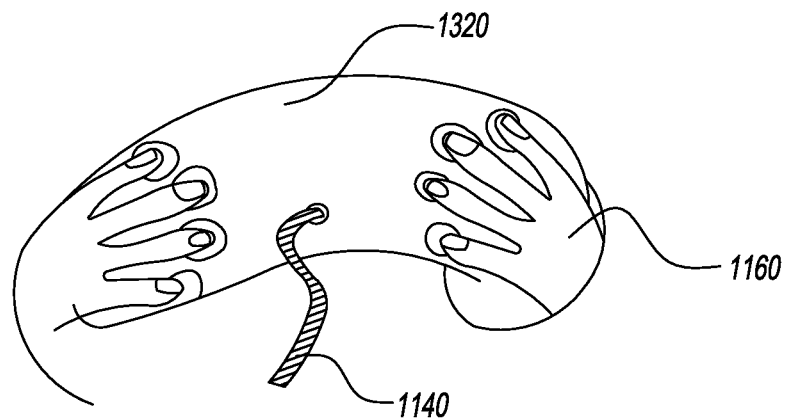
FIG. 13B shows a back view of a custom molded game controller.

FIG. 13B shows a back view of a custom molded game controller. This view show the individual user's hand 1160 and how they have been machined or molded into the game controller that has been molded to an individual user's grip 1320. FIG. 13b also shows a data cable 1140 that may be used to convey information input by the user to the data pretention screen.

Such a data cable 1140 may, for instance, be a wired connection or it may be a wire connection such as, but not limited to, BlueTooth™, WiFi or some combination thereof.

Figure 14:
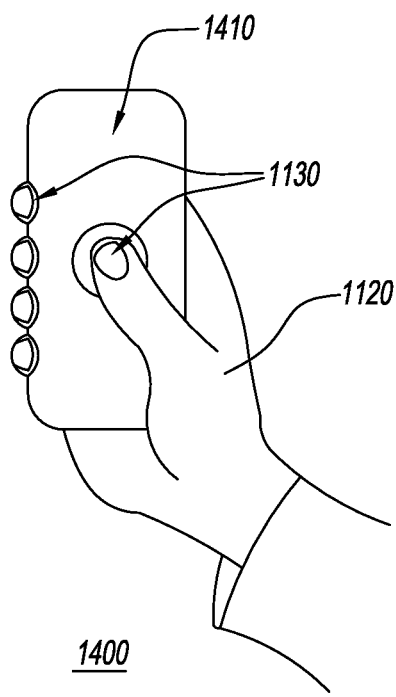
FIG. 14 shows a custom molded remote control.

FIG. 14 shows a custom molded remote control. He customized remote control 1400 may have a remote control body molded to an individual user's grip 1410. The customized remote control 1400 may also have one or more control buttons 1130 that may be positioned such that an individual user's hand 1160 may access them with ease.

Figure 15:
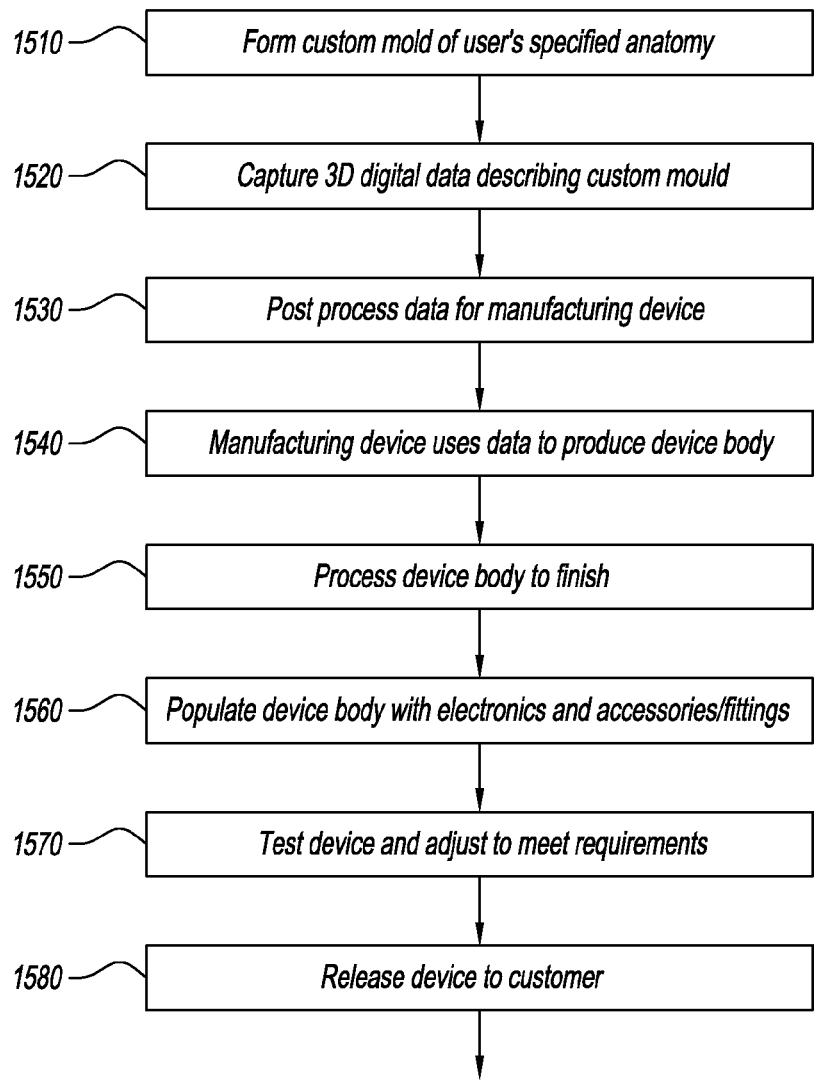
FIG. 15 shows a flow diagram of some of the steps of a preferred method of manufacturing an orthopedic electronic interface device of the present invention.

FIG. 15 shows a flow diagram of some of the steps of a preferred method of manufacturing an orthopedic electronic interface device of the present invention.

In step 1510: Form custom mold of user's specified anatomy, a 3D representation may be made of the anatomy the user wishes to use to interface with, and control cursor motion and other relevant functions. The 3D representation may, for instance, be a physical mold, an optical scan or some combination thereof.

In step 1520: Capture 3D digital data describing custom mold data may be acquired from a mold of the relevant anatomy or it may be obtained directly from the relevant anatomy, or a combination thereof. The data capture may, for instance, be performed by a suitable optical scanner.

In step 1530: Post process data for manufacturing device, the collected data may be massaged or refined by suitable software packages to make the data more compatible with devices that may use it to produce physical reproductions.

In step 1540: Manufacturing device uses data to produce device body, the data may be supplied to an appropriate device that may, for instance, be a computer controlled machine such as, but not limited to, a CNC miller, a CNC lathe, a 3D printing machine or some combination thereof.

In step 1550: Process device body to finish, the device may be finished by, for instance, a technician removing burrs or other residual manufacturing artifacts. Once finished, in step 1560: Populate device body with electronics and accessories/ fittings the appropriate electronics and related accessories may be attached to the device.

In step 1570: Test device and adjust to meet requirements the device may be subject to testing to ensure that it conforms to any or all requirements specified for the particular device. At this point, any short comings may be addressed and/or rectified.

In step 1580: Release device to customer, the finished product may be delivered to a customer.

Although this invention has been described with a certain degree of particularity, it is to be understood that the present disclosure has been made only by way of illustration and that numerous changes in the details of construction and arrangement of parts may be resorted to without departing from the spirit and the scope of the invention.

What is claimed:

1. A method of producing an individually customized cursor control device, comprising the steps of:

providing a block comprising a substantially malleable material shaped to approximate the cursor control device,
      said approximation of the cursor control device, further comprising providing a substantially malleable material shaped to approximate a base, sized to house a motion sensor, a mound, rigidly attached to a top of said base and sized to fit an interior portion of a grasping hand positioned in a substantially functionally neutral posture and a carpal support rigidly attached to said base;
   grasping said block of substantially malleable material;
   preparing using said grasped block of substantially malleable material to function as a molding pattern; and
   molding said cursor control device using said molding pattern.

2. The method of claim 1 wherein using said grasped block to prepare a molding pattern comprises making a 3D scan of said grasped block, and guiding a computer aided cutting machine using said 3D scan to produce said molding pattern.

3. The method of claim 2 wherein said block is approximately shaped such that said carpal support extends out beyond a distal end of an ulna bone attached to said grasping hand.

4. The method of claim 1 wherein preparing said grasped block as a molding pattern further comprises removing a portion of said malleable material so as to ensure removal of a molded device from a mold formed from said molding pattern; and
   adding or removing a layer or a partial layer of a first material so as to compensate for shrinkage or expansion of a second material over a temperature change corresponding substantially to a change from a molding temperature of said second material to 20 degrees centigrade, wherein said cursor control device is comprised of said second material.

5. The method of claim 1 wherein said malleable material is one of clay, silicone, wax, low melting point plastic, putty, oil clay, polymer clay, paper clay and plastercine.

6. The method of claim 1 wherein said molding is one of compaction molding, compression molding, blow molding, thermoforming, vacuum forming and injection molding.

7. The method of claim 1 wherein said molding uses a molding material that is one of a thermosetting plastic, a thermoplastic, fiberglass, a polymer, a glass, a ceramic and a plastic.

\* \* \* \* \*